US007414571B2

(12) United States Patent
Schantz et al.

(10) Patent No.: US 7,414,571 B2
(45) Date of Patent: Aug. 19, 2008

(54) LOW FREQUENCY ASSET TAG TRACKING SYSTEM AND METHOD

(75) Inventors: Hans Gregory Schantz, Hampton Cove, AL (US); Robert E. DePierre, Huntsville, AL (US)

(73) Assignee: Q-Track Corporation, Huntsville, AL (US)

( * ) Notice: Subject to any disclaimer, the term of this patent is extended or adjusted under 35 U.S.C. 154(b) by 288 days.

(21) Appl. No.: 11/215,699

(22) Filed: Aug. 30, 2005

(65) Prior Publication Data

US 2006/0192709 A1    Aug. 31, 2006

Related U.S. Application Data

(63) Continuation-in-part of application No. 10/355,612, filed on Jan. 31, 2003, now Pat. No. 6,963,301, application No. 11/215,699, and a continuation-in-part of application No. 10/958,165, filed on Oct. 4, 2004, now Pat. No. 7,298,314, said application No. 10/355,612.

(60) Provisional application No. 60/607,824, filed on Sep. 8, 2004, provisional application No. 60/562,413, filed on Apr. 15, 2004, provisional application No. 60/404,604, filed on Aug. 19, 2002, provisional application No. 60/404,602, filed on Aug. 19, 2002.

(51) Int. Cl.
*G01S 13/08*    (2006.01)
*G01S 13/66*    (2006.01)

(52) U.S. Cl. .................... 342/125; 342/127; 340/572.1; 340/825.49

(58) Field of Classification Search ............. 340/572.1, 340/572.2, 825.49; 342/125, 127

See application file for complete search history.

(56) References Cited

U.S. PATENT DOCUMENTS

| 716,134 A | 12/1902 | Stone |
|---|---|---|
| 716,135 A | 12/1902 | Stone |
| 749,436 A | 1/1904 | DeForest |
| 758,517 A | 4/1904 | DeForest |
| 899,272 A | 9/1908 | Stone |
| 961,265 A | 6/1910 | Stone |
| 984,108 A | 2/1911 | Roos |
| 1,183,802 A | 5/1916 | DeForest |
| 1,297,313 A | 3/1919 | Bellini |
| 1,342,257 A | 6/1920 | Erskine-Murray et al. |
| 1,357,210 A | 10/1920 | Robinson |

(Continued)

OTHER PUBLICATIONS

Radio Engineering, First Edition, by Frederick Emmons Terman; McGraw-Hill Book Co., Inc., New York; 1932; pp. 494-495.

(Continued)

*Primary Examiner*—Ian J Lobo
(74) *Attorney, Agent, or Firm*—James Richards

(57) ABSTRACT

An apparatus and method for low frequency asset tracking includes a low frequency transmitter tag associated with a cargo container or other high value commodity, a plurality of receivers that detect low frequency signals, and a microprocessor that uses algorithms and/or data pertaining to the propagation characteristics of the signal to locate the position of the container or high value commodity. The tag may include sensors to monitor container properties or conditions, such as temperature, motion, intrusion, RF fields, or other properties of interest. Sensor data may be modulated on the low frequency transmitter signal.

20 Claims, 9 Drawing Sheets

U.S. PATENT DOCUMENTS

| | | |
|---|---|---|
| 1,639,667 A | 8/1927 | Ranger |
| 1,692,051 A | 10/1928 | Patterson |
| 1,717,679 A | 6/1929 | Goldschmidt et al. |
| 1,741,282 A | 12/1929 | Busignies |
| 1,750,668 A | 3/1930 | Green |
| 1,828,531 A | 10/1931 | Gage |
| 1,839,290 A | 1/1932 | Bailey |
| 1,892,758 A | 1/1933 | Winkler et al. |
| 1,900,292 A | 3/1933 | Lieb |
| 1,939,685 A | 12/1933 | Gage |
| 1,939,686 A | 12/1933 | Gage |
| 1,942,526 A | 1/1934 | Willoughby |
| 1,945,952 A | 2/1934 | Nicolson |
| 1,961,757 A | 6/1934 | Gage |
| 1,991,443 A | 2/1935 | Becker |
| 1,991,473 A | 2/1935 | Taylor |
| 2,003,933 A | 6/1935 | Greig |
| 2,134,535 A | 10/1938 | Runge |
| 2,134,716 A | 11/1938 | Gunn |
| 2,160,135 A | 5/1939 | Fritz |
| 2,170,835 A | 8/1939 | Simon |
| 2,198,113 A | 4/1940 | Holmes |
| 2,204,206 A | 6/1940 | Brunner |
| 2,207,267 A | 7/1940 | Plaistowe |
| 2,208,378 A | 7/1940 | Luck |
| 2,213,273 A | 9/1940 | Earp |
| 2,213,874 A | 9/1940 | Wagstaffe |
| 2,234,587 A | 3/1941 | Budenbom |
| 2,234,654 A | 3/1941 | Runge |
| 2,248,727 A | 7/1941 | Strobel |
| 2,255,659 A | 9/1941 | Gage |
| 2,284,475 A | 5/1942 | Plebanski |
| 2,284,812 A | 6/1942 | Gage |
| 2,314,029 A | 3/1943 | Bond et al. |
| 2,314,883 A | 3/1943 | Herson |
| 2,408,039 A | 9/1946 | Busignies |
| 2,408,048 A | 9/1946 | Deloraine et al. |
| 2,419,946 A | 5/1947 | Edwards et al. |
| 2,423,437 A | 7/1947 | Budenbom |
| 2,437,695 A | 3/1948 | Jansky |
| 2,470,787 A | 5/1949 | Nosker |
| 2,524,768 A | 10/1950 | Clark |
| 2,539,413 A | 1/1951 | Fischer |
| 2,586,342 A | 2/1952 | Jarvis |
| 2,651,774 A | 9/1953 | Earp |
| 2,666,038 A | 1/1954 | Hinman, Jr. |
| 2,949,603 A | 8/1960 | Logue |
| 3,025,522 A | 3/1962 | Steiner |
| 3,133,244 A | 5/1964 | Wojtulewicz |
| 3,199,101 A | 8/1965 | Hansel |
| 3,243,812 A | 3/1966 | Williams |
| 3,594,633 A | 7/1971 | Barringer et al. |
| 3,763,419 A | 10/1973 | Barringer |
| 3,936,728 A | 2/1976 | Ghosh et al. |
| 3,983,474 A | 9/1976 | Kuipers |
| 4,017,858 A | 4/1977 | Kuipers |
| 4,045,799 A | 8/1977 | Dapiran |
| 4,314,251 A | 2/1982 | Raab |
| 4,394,831 A | 7/1983 | Egli et al. |
| 4,396,885 A | 8/1983 | Constant |
| 4,622,644 A | 11/1986 | Hansen |
| 4,728,959 A | 3/1988 | Maloney et al. |
| 4,757,315 A | 7/1988 | Lichtenberg et al. |
| 4,788,548 A | 11/1988 | Hammerquist |
| 4,849,692 A | 7/1989 | Blood |
| 4,945,305 A | 7/1990 | Blood |
| 5,541,608 A | 7/1996 | Murphy et al. |
| 5,600,330 A | 2/1997 | Blood |
| 5,627,517 A | 5/1997 | Theimer et al. |
| 5,724,047 A | 3/1998 | Lioio et al. |
| 5,744,953 A | 4/1998 | Hansen |
| 5,767,669 A | 6/1998 | Hansen |
| 5,774,876 A | 6/1998 | Wooley et al. |
| 5,790,076 A | 8/1998 | Sypniewski |
| 5,804,810 A | 9/1998 | Wooley et al. |
| 5,892,441 A | 4/1999 | Wooley et al. |
| 5,955,982 A | 9/1999 | Moulin |
| 5,959,568 A | 9/1999 | Wooley |
| 5,977,913 A | 11/1999 | Christ |
| 5,999,131 A | 12/1999 | Sullivan |
| 6,026,304 A | 2/2000 | Hilsenrath |
| 6,064,339 A | 5/2000 | Wax et al. |
| 6,084,551 A | 7/2000 | Aslan |
| 6,104,344 A | 8/2000 | Wax et al. |
| 6,108,557 A | 8/2000 | Wax et al. |
| 6,112,095 A | 8/2000 | Wax et al. |
| 6,154,657 A | 11/2000 | Grubeck et al. |
| 6,172,499 B1 | 1/2001 | Ashe |
| 6,249,680 B1 | 6/2001 | Wax et al. |
| 6,282,426 B1 | 8/2001 | Wang et al. |
| 6,369,564 B1 | 4/2002 | Khalfin et al. |
| 6,411,104 B1 | 6/2002 | Uesaka et al. |
| 6,427,079 B1 | 7/2002 | Schneider et al. |
| 6,456,239 B1 | 9/2002 | Werb et al. |
| 6,496,701 B1 | 12/2002 | Chen et al. |
| 6,528,991 B2 | 3/2003 | Ashe |
| 6,552,661 B1 | 4/2003 | Lastinger et al. |
| 6,624,626 B2 | 9/2003 | Khalfin |
| 6,674,403 B2 | 1/2004 | Gray et al. |
| 6,691,074 B1 | 2/2004 | Moriya et al. |
| 2004/0070534 A1 | 4/2004 | Halsey et al. |
| 2006/0109106 A1* | 5/2006 | Braun ................ 340/539.13 |
| 2007/0001854 A1* | 1/2007 | Chung et al. ............ 340/572.1 |
| 2007/0152826 A1* | 7/2007 | August et al. ............ 340/572.1 |

OTHER PUBLICATIONS

Radio Physics Course, Second Edition, by Alfred A. Ghirardi; Farrar & Rinehart, Inc., New York; 1942; p. 330.

Small-Aperture Radio Direction-Finding by Herndon H. Jenkins; ArtechHouse, Boston; 1991; pp. 1-23.

Joe Carr's Loop Antenna Handbook, First Edition, by Joseph J. Carr; Universal Radio Research, Reynoldsburg, Ohio; 1999; pp. 84-98.

"Electromagnetic Energy Around Hertzian Dipoles" by Hans Gregory Schantz; IEEE Antennas and Propagation Magazine, vol. 43, No. 2, Apr. 2001; pp. 50-62.

Charles Capps, "Near Field or Far Field?," EDN Magazine, Aug. 16, 2001, pp. 95-102.

John D. Kraus, Antennas, McGraw Hill, New York, Second Edition, 1988, pp. 60-61.

D. T. Kemp, D. Llanwyn Jones, "A New Technique for the Analysis of Transient ELF Electromagnetic Disturbances Within The Earth-Ionosphere Cavity," Journal of Atmosheric and Terrestrial Physics, vol. 33, pp. 567-572, 1971, Pergamon Press.

PCT International Search Report, mailed Apr. 1, 2004.

Gunderson et al., "Technical Report TR-2201-AMP: Naval Total Asset Visibility (NTAV) Precision Asset Location(PAL) System Tests on the SS Curtuss," Engineering Services Center, Port Hueneme, California, Jan. 2004.

J.C. Slater, Microwave Transmission, New York: McGraw-Hill Book Company, Inc., 1942, pp. 124-129.

* cited by examiner

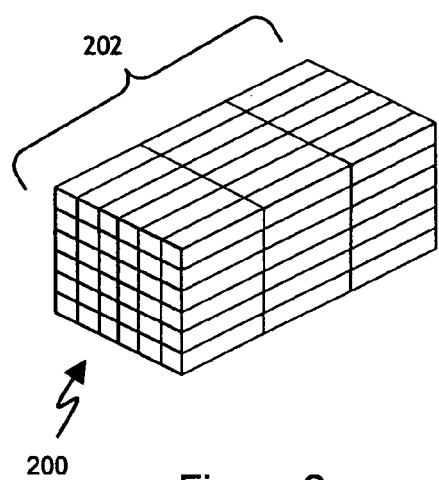
Figure 2
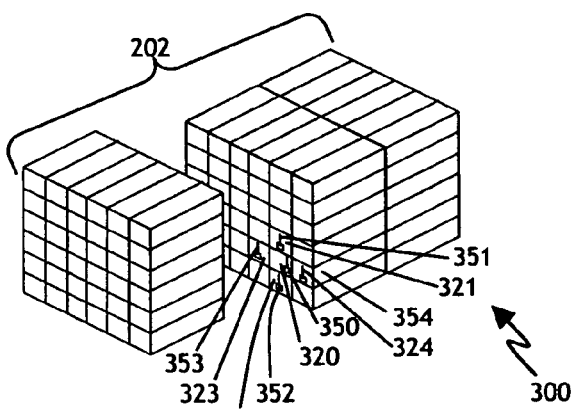
Figure 3
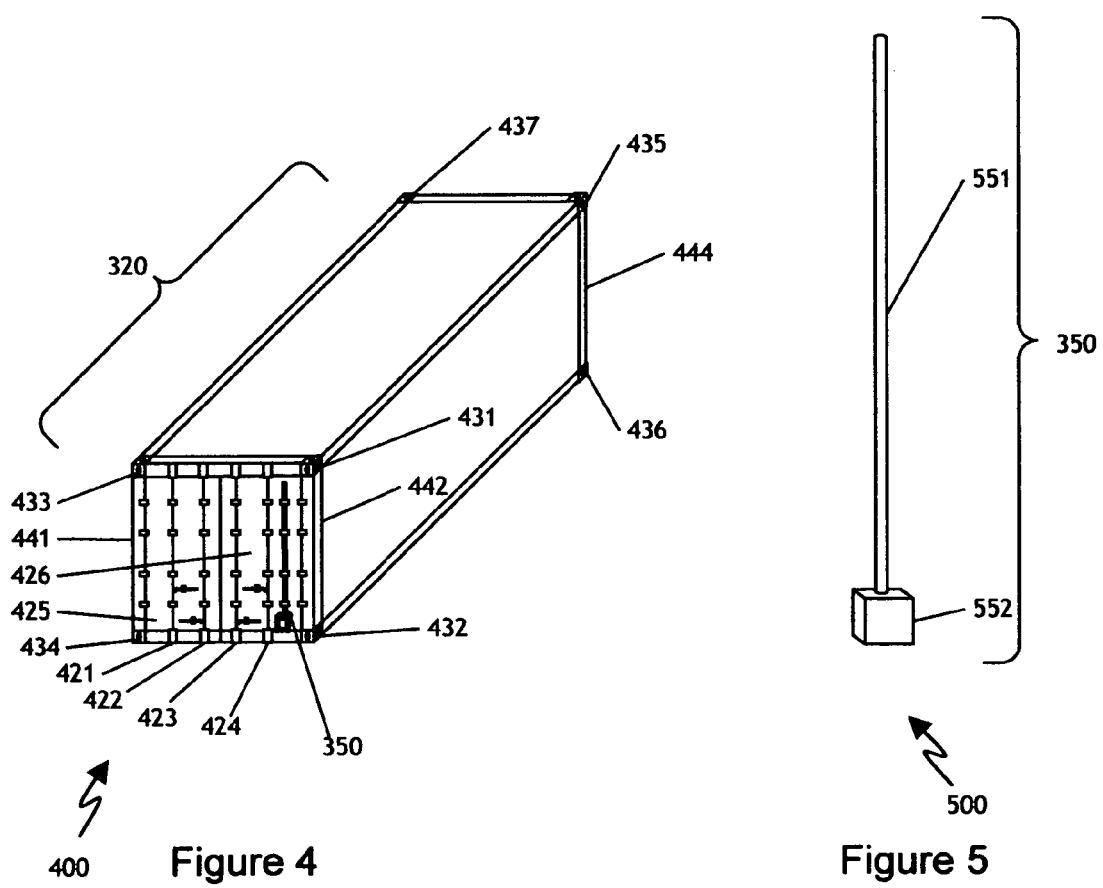
Figure 4
Figure 5

LOW FREQUENCY ASSET TAG TRACKING SYSTEM AND METHOD

This application is a continuation in part of applicant's "System and Method for Near-Field Electromagnetic Ranging" application Ser. No. 10/355,612; Pub. No. US 2004/0032363, filed Jan. 31, 2003, which claims the benefit of Provisional Application 60/404,602, filed Aug. 19, 2002 and Provisional Application 60/404,604 filed Aug. 19, 2002; this application also claims the benefit of provisional application U.S. 60/607,824 filed Sep. 8, 2004; This application is also a continuation in part of "Near Field Electromagnetic Positioning System and Method," Filed Oct. 4, 2004, Ser. No. 10/958,165, published as Pub. No. US 2005/0046608 A1 to Schantz et al.; said Ser. No. 10/958,165 is also a continuation in part of said 10/355,612; said 10/958,165 also claims the benefit of 60/562,413 filed 40/15/2004 by Schantz; all of the above applications are incorporated herein by reference in their entirety.

The U.S. Government has a paid up license in this invention and the right in limited circumstances to require the patent owner to license others on reasonable terms as provided for by the terms of contract NBCHC040063 awarded by Dept. of Homeland Security, Advanced Research Projects Agency.

BACKGROUND

1. Field of the Invention

The present invention relates generally to measurement of position or location by means of electromagnetic signaling and especially to a system and method for evaluating the position and associated data of a transmitter using a plurality of low frequency receivers.

2. Background of the Invention

A variety of prior art solutions seek to track the positions of shipping containers. Especially challenging are shipping containers concealed in or obscured by a stack of containers as may be encountered in a shipping yard or aboard ship. These prior art solutions include global positioning systems (GPS) and transponder ranging type systems. GPS uses weak signals that do not propagate well in non-line-of-sight environments.

Similarly, time-of-flight or transponder ranging works poorly in the non-line-of-sight environment between and around shipping containers. Delay spreads in shipping container environments often exceed 1 µs, making it extremely difficult to time signals to an accuracy of a few nanoseconds and thus range to an accuracy on the order of a meter, as described in: "*Technical Report: Naval Total Asset Visibility (NTAV) Tests on the SS Curtiss*, Port Hueneme, Calif., 25 Sep.-6 Oct. 2000," by Gunderson et al.

Practitioners of the RF arts generally recognize that electromagnetic waves propagate best when a waveguide, or propagation environment has gaps at least equal to roughly a half wavelength in dimension at the frequency of propagation [J. C. Slater, Microwave Transmission, (New York: McGraw-Hill Book Company, Inc.), 1942, pp. 124-129]. Typical gap sizes between stacked containers are on the order of about 10 cm. Thus, it is generally believed that significant electromagnetic wave propagation cannot occur between stacked containers when the frequency is significantly less than 1.5 GHz.

Traditional RF practice is thus caught between the Scylla of the requirement for high frequencies to support electromagnetic wave propagation in narrow gaps and the Charybdis of high multipath and delay spreads that render traditional time-of-flight positioning technology ineffective.

Modern supply chain management practices demand precise and timely information on the status of goods in commerce. Additionally, keeping containers secure and safe from tampering is a priority throughout the supply chain. Furthermore, there are some 15 million shipping containers at present in the world. Any one of these containers could arrive in a friendly port carrying a deadly cargo. There is an immediate and significant need for a system to secure and track shipping containers. Thus there is a corresponding need for an electromagnetic communication and tracking technology that can effectively track and monitor shipping containers alone or in stacks; in yards or aboard ship and can overcome the problems associated with traditional RF technologies.

SUMMARY OF THE INVENTION

An apparatus and method for low frequency asset tracking includes a low frequency transmitter tag associated with a cargo container or other high value commodity, a plurality of receivers that detect low frequency signals, and a microprocessor that uses algorithms and/or data pertaining to the propagation characteristics of the signal to locate the position of the container or high value commodity. The tag may include sensors to monitor container properties or conditions, such as temperature, motion, intrusion, RF fields, or other properties of interest. Sensor data may be modulated on the low frequency transmitter signal.

In one embodiment, the wavelength of the low frequency signal is longer than the characteristic dimensions of the cargo container. In another embodiment, the wavelength is longer than the distance to be measured, preferably a half wavelength is longer than the distance to be measured. The long wavelength is particularly advangageous for low attenuation and for accurate resolution of distance and position.

Distance may preferably be determined by measuring and comparing two properties of the transmitted signal. In particular, E field and H field amplitude and E field and H field phase may provide accurate distance information, even when the transmitter is embedded within a stack of cargo containers.

In one embodiment, the tag also measures RF fields which may be indicative of suspicious activity, such as cell phone band RF fields, which have been used for detonating terrorist bombs.

In a further embodiment, the system includes a database of measurements of electromagnetic properties previously taken at a plurality of known positions, wherein a processing unit utilizes the database of measurements to determine the position of the transmitter.

BRIEF DESCRIPTION OF THE DRAWINGS

FIG. 2 is a schematic diagram depicting a stack of shipping containers.

FIG. 3 is a schematic diagram depicting a stack of shipping containers showing a tagged container.

FIG. 4 is a schematic diagram depicting a tagged shipping container.

FIG. 5 is a schematic diagram of a preferred embodiment of a Low Frequency Marine Asset Tag.

DETAILED DESCRIPTION OF THE PREFERRED EMBODIMENTS

Overview of the Invention

The present invention is directed to a Low Frequency Asset Tag Tracking system and method. The present invention enables tracking of high value assets, such as shipping containers, and data communications to and from tags associated with high value assets.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

Electromagnetic Wave Propagation

Figure 1:
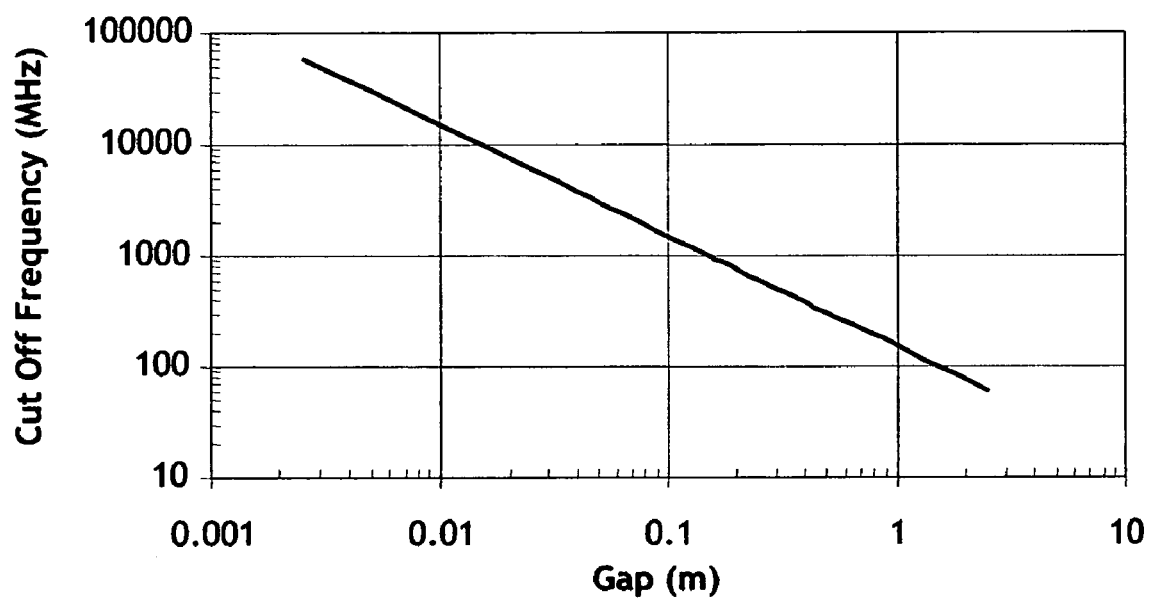
FIG. 1 shows the cutoff frequency vs gap size between stacked shipping containers for propagation of electromagnetic waves.

Ideally, electromagnetic wave propagation between parallel conducting plates requires a gap of a half wavelength or larger. The frequency corresponding to one half wavelength for the gap size represents a cutoff frequency for the gap. Frequencies higher than the cutoff frequency are passed while frequencies lower than the cutoff frequency are attenuated. FIG. 1 presents plot 100 of the cutoff frequency vs gap size for propagation of electromagnetic waves. When shipping containers are closely stacked, gaps between shipping containers are on the order of ten centimeters or less. Referring to plot 100 of FIG. 1, frequencies higher than about 1.5 GHz are required for significant electromagnetic propagation through these narrow gaps. However, these high frequencies with short wavelengths are prone to multipath and reverberation in the complex propagation environment between and around stacked shipping containers.

Traditional RF practice usually employs high frequencies and wavelengths much shorter than the scale of a typical propagation environment. Such RF systems operate in the "far field" where electromagnetic signals behave as radiation or waves. Behavior in the "near field" (which for purposes of the present discussion may be assumed to be within a wavelength of a transmit antenna) has traditionally been dismissed as a minor nuisance devoid of significant interest.

The present invention takes advantage of this little appreciated aspect of electromagnetic propagation. By using low frequencies with long wavelengths, the present invention exploits near field behavior including conduction and inductive coupling to not only locate but also communicate with Marine Asset Tags placed on shipping containers. These low frequency inductive and conductive modes of propagation offer lower attenuation and better signal location than traditional high frequency electromagnetic wave propagation through narrow gaps.

The low frequencies readily propagate through the narrow gaps between shipping containers in a stack, giving rise to "hot spots:" RF currents on the exterior of a stack. Hot spots may be localized using signal strength techniques, phase comparison techniques, or (preferentially) near field electromagnetic ranging. Once the locations of the hot spots have been determined, position of a shipping container may be inferred.

In the present context "low frequencies" are those with "long wavelengths." "Long wavelengths" are wavelengths at least comparable in length to a characteristic dimension of a propagation environment. For instance, a typical propagation environment might be a stack of containers 61 meters (200 feet) across or an intermodal yard spanning 305 meters (1000 feet.) In the stack or yard environments, the present invention teaches using wavelengths comparable to the stack or yard dimensions or even longer. In one embodiment of the invention, the wavelength is longer than the dimension being resolved, i.e. the 61 meters in the case of the stack, or the 305 meters in the case of the yard. Preferably a half wavelength is longer than the distance being resolved. In an alternative embodiment, the wavelength is longer than a dimension of the container, such as the overall length, width or height to take full advantage of the low attenuation of low frequencies.

An alternate but equivalent way of describing the teachings of the present invention is in terms of the distinction between "near field" and "far field." The boundary between "near-field" and "far-field" has been defined as close to an antenna as $\lambda/16$ and as far away as $3\lambda$. (where $\lambda$ is the wavelength) If the characteristic size or aperture (D) of an antenna is comparable to the wavelength in question (D~$\lambda$) or greater, then the near-far field boundary may extend much further [Ref: Charles Capps, "Near Field or Far Field", EDN Aug. 16, 2001, pp. 95-102]. The present invention teaches using antennas that are very small with respect to the wavelength of the associated signal. Typically, these antennas are one hundredth of a wavelength (D~$0.01\lambda$) or even smaller. Thus, for purposes of understanding a Low Frequency Marine Asset Tag Tracking system, a near field antenna is well modeled as an infinitesimal dipole or loop, and the near-far boundary may be taken as the range where near fields become negligible relative to far fields, approximately $\lambda/2=0.50\lambda$. Thus "near-field range" is a range within approximately a half wavelength at a particular operational frequency.

In summary, the present invention teaches using low frequency, long wavelength radio waves. Equivalently, the present invention teaches using radio waves such that a propagation environment is substantially within near-field range.

Tracking Shipping Containers in Stacks

FIG. 2 depicts a stack 210 of shipping containers. FIG. 2 shows a stack 210 of shipping containers six high, six wide and three long. Intermodal shipping containers are designed to be stacked vertically and may be placed in closely spaced stacks 210 as shown, or spaced as needed for efficient handling. One of the challenges in managing shipping containers is being able to locate a particular shipping container in a field of hundreds or thousands of shipping containers, especially when the desired container may be internal to a stack 210 as shown in FIG. 2. The present invention utilizes low frequency near field radio waves to accurately locate a container even when it is internal to a stack of containers.

FIG. 3 presents an exploded view of the shipping container stack 210 of FIG. 2. Exploded view 300 shows the location of a particular container 320 with an associated Low Frequency Marine Asset Tag 350 installed on one end. Other containers in the stack are also identified and may also have associated tracking tags. Container 320 lies on top of container 322 below. Container 320 supports container 321 above. Container 320 is further supported by container 323 and container 324 to the sides. Containers 321, 322, 323, and 324 may have assocated tracking tags 351, 352, 353, and 354 respectively.

FIG. 4 presents a schematic diagram 400 of shipping container 320 oriented to show left rear door 425 and right rear door 426. Left rear door 425 is hinged to left rear corner post 441 and right rear door 426 is hinged to right rear corner post 442. First locking bar 421 and second locking bar 422 secure left rear door 425. Similarly third locking bar 423 and fourth locking bar 424 secure right rear door 426.

Shipping container 320 is shown as a general purpose 40 ft×8.0 ft×8.5 ft container for purposes of illustration and not limitation. The principles of the present invention will apply equally well to refrigerated shipping containers (also called "reefers"), to 20 ft long general purpose containers, or (with some modest and inconsequential changes) to any other kind of standard shipping container.

When shipping container 320 is stored in stack 202, a container above shipping container 320 (such as container 321 shown in FIG. 3) rests on a right rear top corner casting 431, a left rear top corner casting 433, a right front top corner casting 437, and a left front top corner casting 435. Similarly, when shipping container 320 is stored in a stack, a container below shipping container 320 (such as container 322 shown in FIG. 3) rests on a right rear bottom corner casting 432, a left rear bottom corner casting 434, a left front bottom corner casting (not shown), and a right front bottom corner casting 436. Corner castings 431-437 cooperate to create spaces between shipping container 320 and adjacent shipping containers (like containers 321-324 shown in FIG. 3).

The Low Frequency Marine Asset Tag 350 is secured to the rear door of the shipping container such as right rear door 426. The Low Frequency Marine Asset Tag 350 occupies a space formed by cooperation of locking bars 421-424, rear corner castings 431-434, and rear corner posts 441-442. The Low Frequency Marine Asset Tag 350 is thus largely protected from crushing or other damage.

FIG. 5 presents schematic diagram 500 of the Low Frequency Marine Asset Tag 350 comprising near field antenna 551 and enclosure 552. Near field antenna 551 is comparable in form factor to locking bars 421-424 as shown in FIG. 4 and similarly secured. Although near field antenna 551 is shown as a cylindrical rod, near field antenna 551 might alternatively be a wire or plate electrically isolated from shipping container 320 shown in FIG. 4. Near field antenna 551 should be as long as possible and as far away from shipping container 320 (shown in FIG. 4) given space constraints for maximal performance. Simultaneously, near field antenna 551 should be close enough to shipping container 320 (shown in FIG. 4) so as to avoid mechanical contact or damage from adjacent containers. In alternate embodiments, near field antenna 551 may be a loop or loopstick antenna instead of a whip antenna.

Enclosure 552 is preferentially conducting and electrically connected to shipping container 320 (shown in FIG. 4). In alternate embodiments, enclosure 552 may be mounted inside a shipping container door with an electrical connection passing through a door to a near field antenna, or other antennas. In still further alternate embodiments, enclosure 552 may be placed anywhere space permits in shipping container 320 (shown in FIG. 4). Nothing in this disclosure precludes the functionality of Low Frequency Marine Asset Tag 550 from being distributed in multiple locations in, on, or around shipping container 320.

Near Field Propagation Around Shipping Containers

This section considers near field propagation around stacked shipping containers for purposes of tracking shipping containers and receiving low data rate communications from shipping containers.

Figure 6:
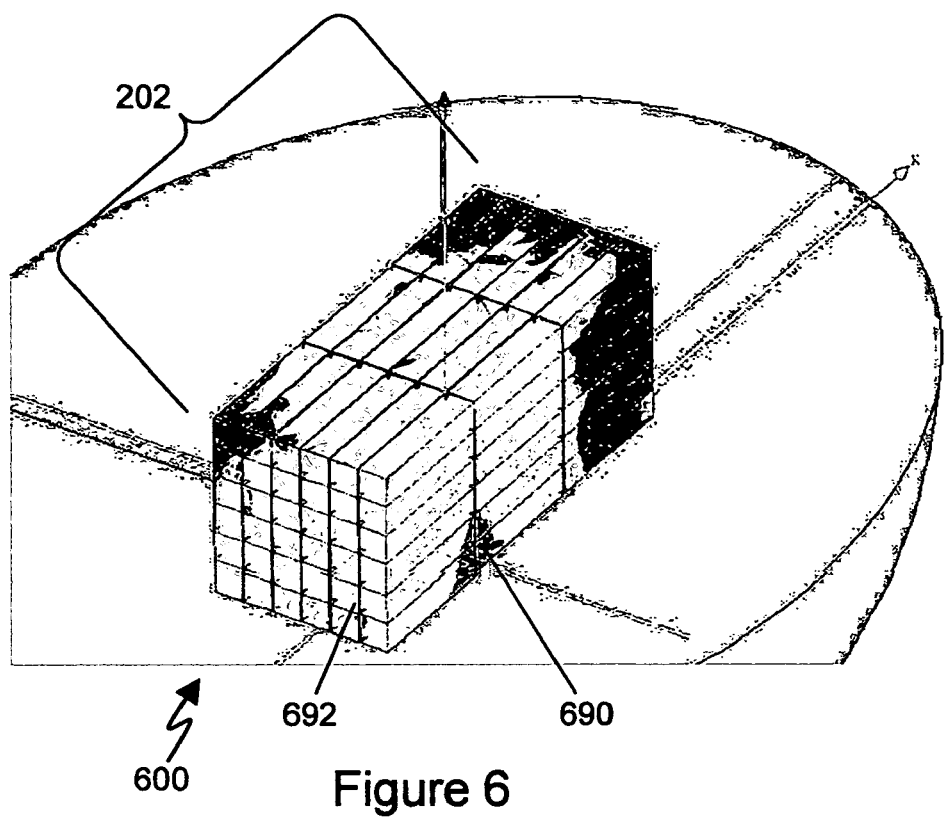
FIG. 6 shows results of a computer analysis of currents on a container stack from a 525 kHz Low Frequency Marine Asset Tag.

Computer analysis demonstrates how low frequency signals operating within near field range are ideal for localizing Low Frequency Marine assets even in the complicated propagation environment of a stack of shipping containers. FIG. 6 shows results 600 of a computer analysis of currents on container stack 202 due to a 525 kHz Low Frequency Marine Asset Tag. At 525 kHz, the wavelength is 571 m (1874 ft). This wavelength is much longer than height (15.5 m or 51 ft), length (36.6 m or 120 ft), or width (14.6 m or 48 ft) of container stack 202. Thus hotspots 690 and 692 correlate well to the position of shipping container tag 350 (as shown in FIG. 3).

Hotspots 690 and 692 may be located using near field electromagnetic ranging. Near field electromagnetic ranging was first fully described in applicant's co-pending "System and Method for Near-Field Electromagnetic Ranging" (application Ser. No. 10/355,612; Pub. No. US 2004/0032363). This patent document is incorporated herein by reference.

Figure 7:
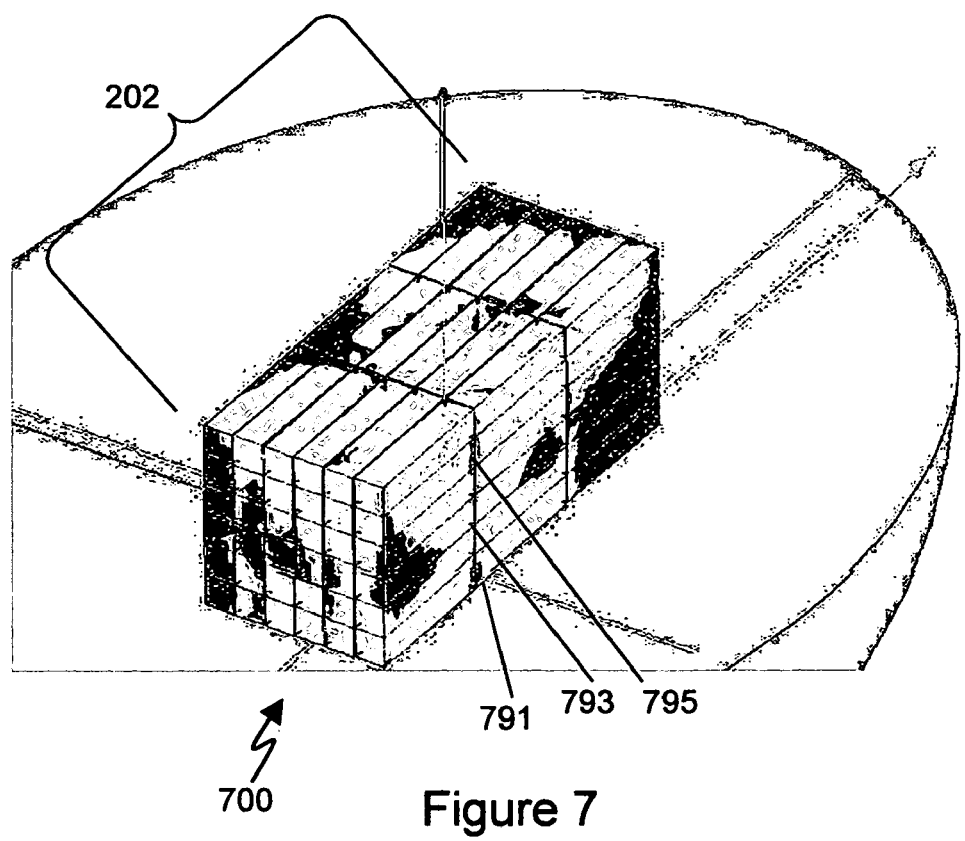
FIG. 7 shows results of a computer analysis of currents on a container stack from a 13 MHz Low Frequency Marine Asset Tag.

FIG. 7 shows results 700 of a computer analysis of currents on container stack 202 due to a 13 MHz Low Frequency Marine Asset Tag. At 13 MHz, the wavelength is 23 m (76 ft). A half wavelength is 11.6 m or 38 ft. There is a distinct resonance pattern apparent on the side of shipping container stack 710. The resonant pattern exhibits hot spots or antinodes 795 and 791 away from the true location of shipping container tag 350 (as shown in FIG. 3). The resonance pattern further exhibits a null or node 793 exactly where one might seek some indication of the presence of shipping container 350 (as shown in FIG. 3). These relatively high frequency signals provide erroneous indications of the location of shipping container tag 350 (as shown in FIG. 3). Thus the lower frequencies taught by the present invention, such as those within or in the vicinity of the AM broadcast band are preferred.

Figure 8:
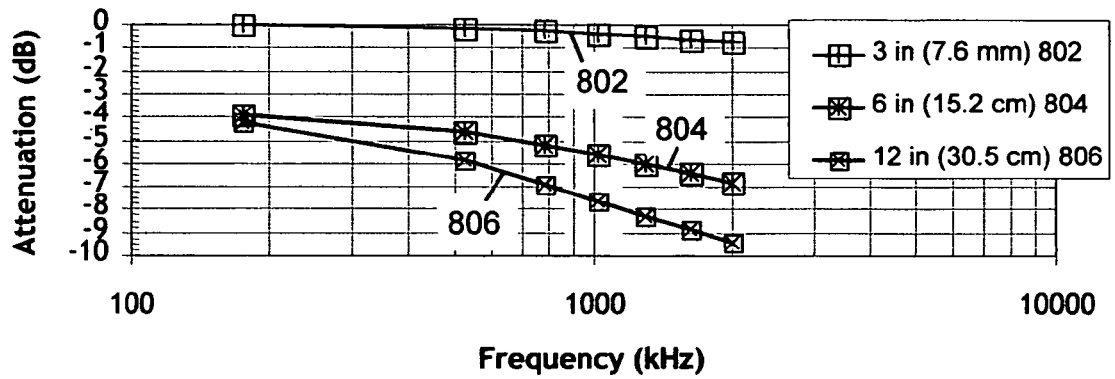
FIG. 8 shows results of a computer analysis of electric field propagation along the short axis of a typical shipping container as a function of frequency.

Low frequency, near field signals are not only useful for localizing shipping containers, these signals also propagate readily between shipping containers making them ideal for low data rate communications links. FIG. 8 shows results 800 of a computer analysis of electric field propagation along the short axis of a typical shipping container as a function of frequency. Curves 802, 804, and 806 show the attenuation vs frequency for 7.6, 15.2, and 30.5 centimeter gap widths respectively. The gap width represents the spacing between containers from the back of one container to the front of another—the space where the asset tag 320 is mounted.

Figure 9:
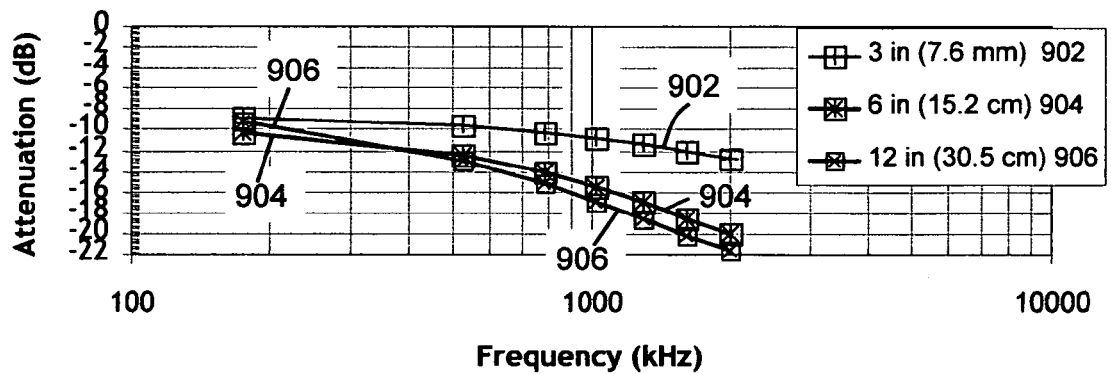
FIG. 9 shows results of a computer analysis of electric field propagation along the long axis of a typical shipping container as a function of frequency.

FIG. 9 shows results 900 of a computer analysis of electric field propagation along the long axis of a typical shipping container as a function of frequency. Curves 902, 904, and 906 show the attenuation vs frequency for 7.6, 15.2, and 30.5 centimeter gap widths respectively. Again, the gap width represents the spacing between containers from the back of one container to the front of another—the space where the asset tag 320 is mounted. At typical frequencies that might be used in a Low Frequency Marine Asset Tag Tracking system, such as those below a few MHz, attenuation is relatively modest. In fact, the closer the spacing between containers, the better the propagation. This result runs counter to the conventional expectation that high frequencies are required for propagation through narrow gaps.

This result is surprising because conventional RF systems assume far field, electromagnetic wave propagation. Near field effects are generally regarded as a nuisance and ignored. By taking advantage of near field propagation and the direct conduction of signals around and between shipping containers, the present invention is able to achieve remarkable success propagating signals through a stack of conductive shipping containers and using the signals to locate the source embedded within the stack.

Detailed Description of a Low Frequency Marine Asset Tag Tracking System

Figure 10:
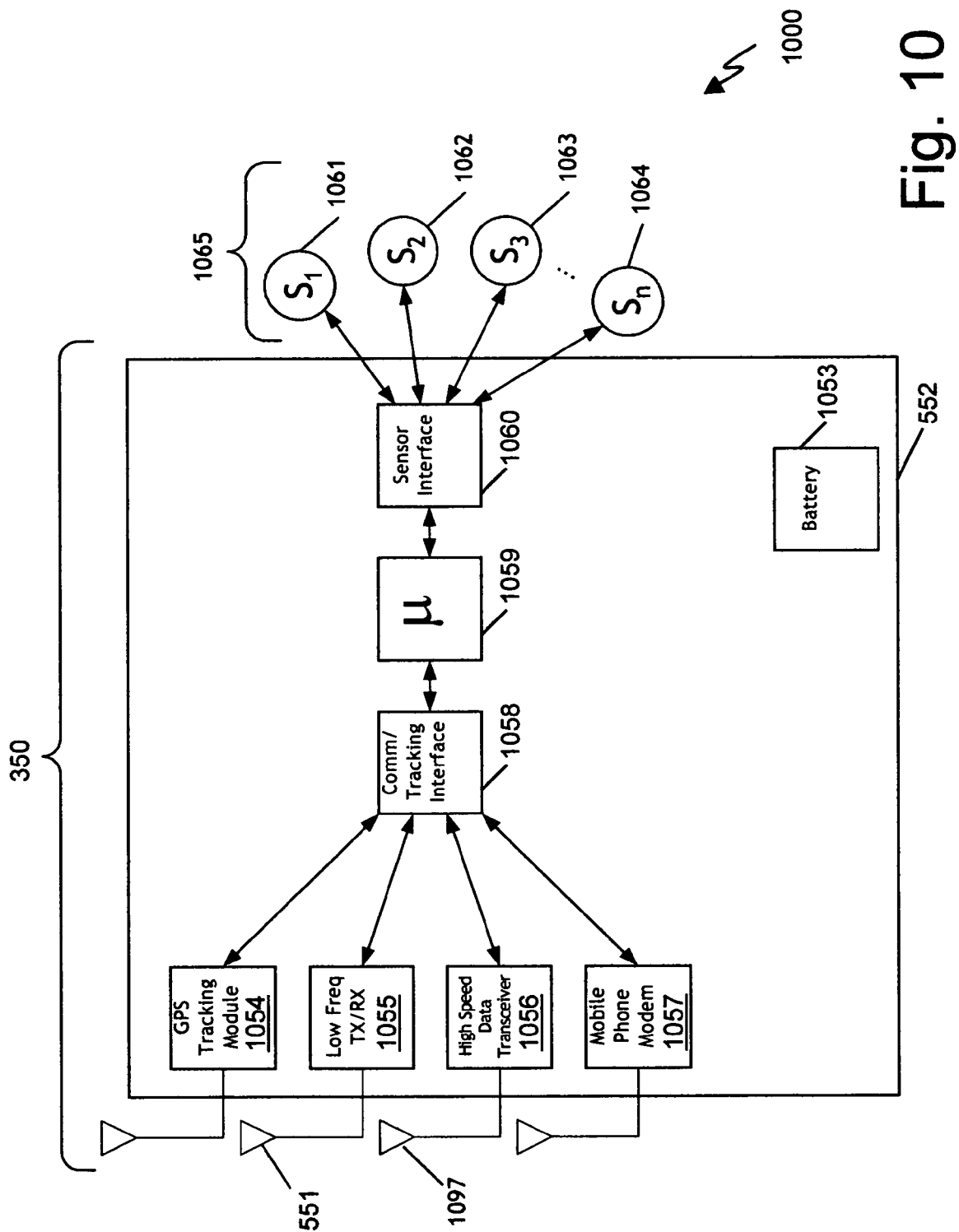
FIG. 10 provides a block diagram of a Low Frequency Marine Asset Tag.

FIG. 10 provides a block diagram 1000 of a Low Frequency Marine Asset Tag 350. A Low Frequency Marine Asset Tag 350 includes near field transceiver 1055. Near field transceiver 1055 is capable of radiating a low frequency near field signal. This low frequency near field signal may be modulated to convey identifying information, telemetry on container status, or other useful data. For optimal tracking ability, near field transceiver 1055 may transmit an unmodulated signal. Near field transceiver 1055 is also capable of receiving a low frequency near field signal. The low frequency near field signal may include control signals, requests for information, or other useful data.

The Low Frequency Marine Asset Tag 350 is preferentially a modular unit capable of supporting a variety of alternate tracking and communications modules including (for reason of illustration and not for reasons of limitation) GPS tracking module 1054, high speed data transceiver 1056, mobile phone modem 1057. Being high frequency devices, these illustrative modules can use relatively small, unobtrusive antennas.

Communications and tracking modules 1054-1057 exchange control and data signals via communications/tracking interface 1058 (also referred to as comms/tracking interface 1058). Comms/tracking interface 1058 preferentially supports a variety of alternate communications and tracking modules. Comms/tracking interface 1058 conveys signals intermediate communications and tracking modules 1054-1057 and microprocessor 1059. Comms/tracking interface 1058 may include wired, wireless, or other links to communications and tracking modules 1054-1057.

Microprocessor 1059 includes input/output capability, memory and/or data storage capability, and processing capability. Preferentially, microprocessor 1059 also includes the ability to monitor data from sensor net 1065, apply rules, and react to data from sensor net 1065. Microprocessor 1059 can convey data, alarms, alerts, or status information via comms/tracking interface 1058 to a communication and tracking module such as low frequency transceiver 1055. Microprocessor 1059 can store and allow retrieval of other information including for instance invoices, bills of lading, material safety data, and sensor logs.

Sensor interface 1060 exchanges control and data signals intermediate a sensor net 1065 and a microprocessor 1059. Sensor interface 1060 may include wired or wireless links to sensor net. Sensor interface 1060 is preferentially compatible with IEEE 1451.2 or similar such protocols for data exchange. Preferentially, sensor interface 1060 enables a modular approach to sensor net 1065 in which a wide variety of sensors may be selected to fulfill a variety of desired missions, including container security, container surveillance, container integrity, and container safety.

Sensor net 1065 includes a variety of sensors. For purposes of illustration and not limitation, first sensor 1061 might detect whether left rear door 425 or right rear door 426 (as shown in FIG. 4) is open. Second sensor 1062 might detect motion and thus be able to determine presence of animals or people inside shipping container 320. Third sensor 1063 might detect the presence of dangerous chemical or biological agents or the presence of ionizing radiation that might indicate the presence of dangerous nuclear materials. As many additional sensors as might be desired may be added, up to and including an $n^{th}$ sensor that might detect temperature or other environmental characteristics. Sensor net 1065 enables container integrity and security to be preserved and also allows early detection of potential hazards or other anomalies. Discussions of specific sensors are for purposes of illustration not limitation.

The Low Frequency Marine Asset Tag 350 is preferentially capable of entering a low power or dormant state to preserve the life of battery 1053. Optimally, a Low Frequency Marine Asset Tag 350 will wake to an active state upon appropriate stimuli from a sensor or from and external control signal.

Although a Low Frequency Marine Asset Tag 350 is shown as an integral unit contained within an enclosure 1052, in alternate embodiments the functionality of Low Frequency Marine Asset Tag 350 may be dispersed or distributed in various location through out a shipping container 320.

Operation of a Low Frequency Marine Asset Tag Tracking System in a Network

Figure 11:
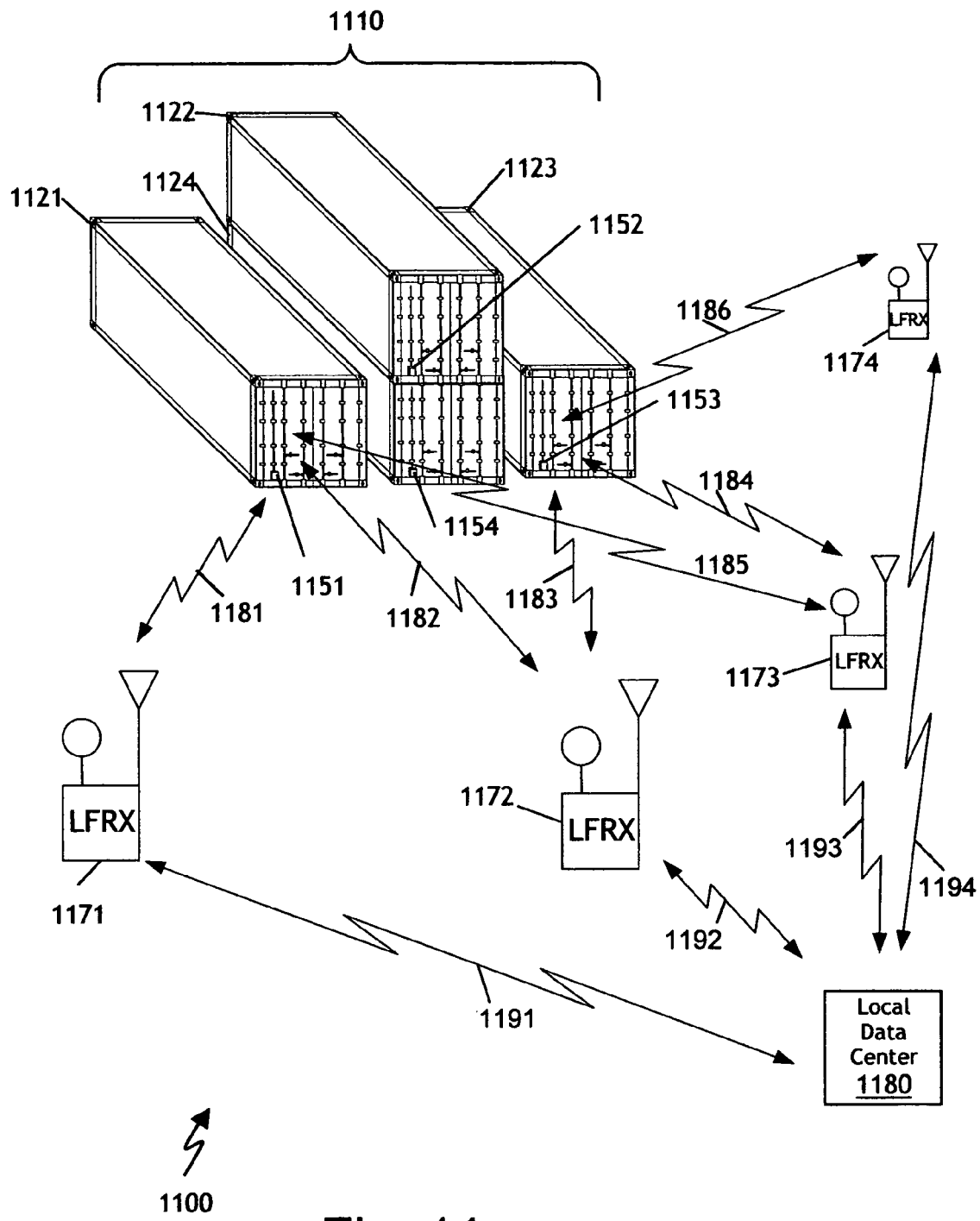
FIG. 11 is a schematic diagram of Low Frequency Marine Asset Tag communicating with low frequency receivers (LFRXs).

FIG. 11 presents a schematic diagram of Low Frequency Marine Asset Tag Tracking System 1100. Low Frequency Marine Asset Tag Tracking System 1100 includes Low Frequency Marine Asset Tags 1151-1154, Low Frequency Receivers (LFRXs) 1171-1174, and local data center 1180. Low Frequency Marine Asset Tag Tracking System 1100 may operate in an intermodal yard, on board a container ship, or any other place where shipping containers are moved or stored.

First container 1121, second container 1122, third container 1123, and fourth container 1124 cooperate to form container stack 1110. Container stack 1110 comprises four containers for reasons of illustration and not limitation—the teachings of the present invention are applicable to stacks of significantly larger sizes.

Referring to FIG. 11, first Low Frequency Marine Asset Tag 1151 is attached to first container 1121, second Low Frequency Marine Asset Tag 1152 is attached to second container 1122, third Low Frequency Marine Asset Tag 1153 is attached to third container 1123, and fourth Low Frequency Marine Asset Tag 1154 is attached to fourth container 1124.

First LFRX 1171 receives first signal 1181 from Low Frequency Marine Asset Tag 1151. Second LFRX 1172 receives second signal 1182 from Low Frequency Marine Asset Tag 1151. Third LFRX 1173 receives fifth signal 1185 from Low Frequency Marine Asset Tag 1151. Fourth LFRX 1174 does not receive a signal from Low Frequency Marine Asset Tag 1151.

Receiving LFRXS 1171-1173 convey status data received from Low Frequency Marine Asset Tag 1151 to a local data center 1180 via links 1191-1194. Links 1191-1194 may be via wireless, wired, or other transmission means. Receiving LFRXS 1171-1173 also convey signal characteristics of first signal 1181, second signal 1182, or fifth signal 1185 to a local data center 1180 via links 1191-1193. These signal characteristics may include signal strength, phase information, and/or the results of a comparison between two or more signal characteristics. One comparison of particular value is a comparison of electric and magnetic field phase.

Local data center 1180 may use signal characteristics to identify the location of Low Frequency Marine Asset Tag 1151 and associated shipping container 1121. In addition, local data center 1180 may store, analyze, or report status data pertaining to Low Frequency Marine Asset Tag 1151.

Similarly, second LFRX 1172 receives third signal 1183 from Low Frequency Marine Asset Tag 1153. Third LFRX 1173 receives fourth signal 1184 from Low Frequency Marine Asset Tag 1153. Fourth LFRX 1174 receives sixth signal 1186 from Low Frequency Marine Asset Tag 1153. First LFRX 1171 does not receive a signal from Low Frequency Marine Asset Tag 1153.

Signals may include a periodic confirmation (or "heartbeat" signal) that all is well with Low Frequency Marine Asset Tag 1153, or an alarm or alert condition.

Receiving LFRXs 1172-1174 convey status data received from Low Frequency Marine Asset Tag 1153 to a local data center 1180 via links 1192-1194. Links 1192-1194 may be via wireless, wired, or other transmission means. Receiving LFRXs 1172-1174 also convey signal characteristics of third signal, fourth signal 1184, and sixth signal 1186 to a local data center 1180 via links 1192-1194. These signal characteristics may include signal strength phase information and/or the results of a comparison between two or more signal characteristics. One comparison of particular value is a comparison of electric and magnetic field phase. Local data center 1180 may use signal characteristics to identify the location of Low Frequency Marine Asset Tag 1153 and associated shipping container 1123. In addition, local data center 1180 may store, analyze, or report status data pertaining to Low Frequency Marine Asset Tag 1153.

LFRXs such as LFRXs (1171-1174) may include a transmit capability to send control signals or other useful data to Low Frequency Marine Asset Tags such as (1151-1154). In alternate embodiments this transmit capability may include a high speed data link suitable for rapid exchanges of invoices, sensor logs, transmission schedules, handshaking, security, encryption keys, or other useful data.

A Low Frequency Marine Asset Tag Tracking System may employ a wide variety of relatively narrowband signals. For instance, a Low Frequency Marine Asset Tag Tracking System might use a modulation bandwidth of 300 Hz to support over a thousand channels at frequencies within the AM broadcast band (510-1705 kHz). Additional capacity to allow tracking many tags may be obtained by employing time division access in which short transmissions occur at a low duty cycle. Transmissions may be either coordinated and scheduled, or at random times, relying on a low probability of signal collision to achieve multi-user access.

Detail of a Near Field Receiver (LFRX)

Figure 12:
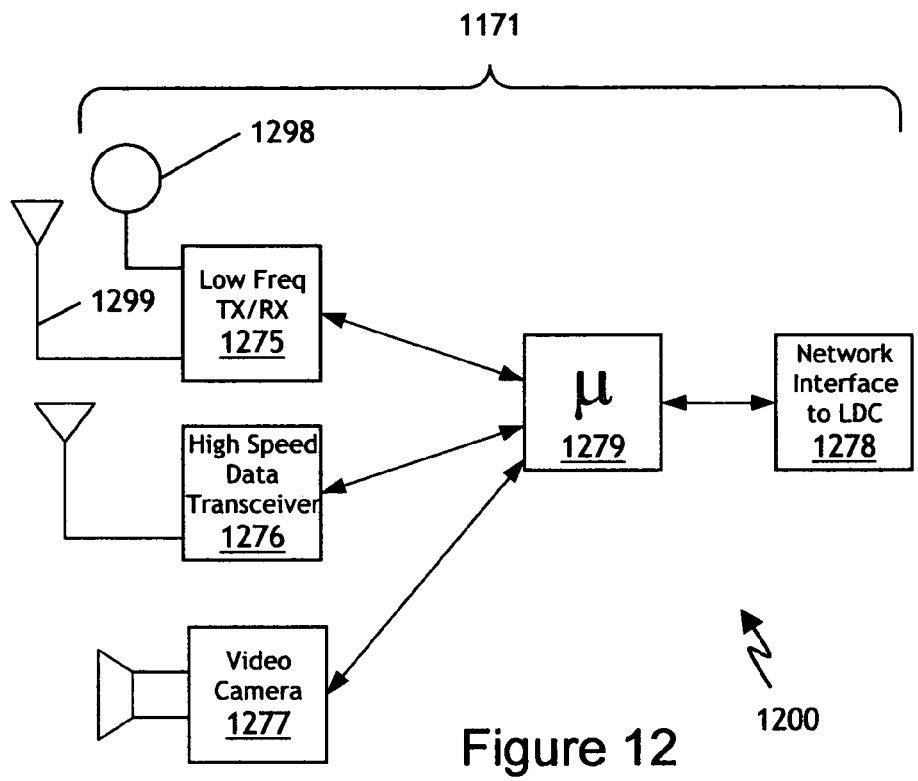
FIG. 12 provides a block diagram of a low frequency receiver (LFRX).

FIG. 12 provides block diagram 1200 of low frequency receiver (LFRX) 1171. LFRX 1171 comprises low frequency transceiver 1275 with electric antenna 1299 and magnetic antenna 1298, high speed data transceiver 1276, microprocessor 1279, and network interface 1278. In alternate embodiments, LFRX 1171 may also include optional video camera 1277.

Low frequency transceiver 1275, is preferentially a near field electromagnetic ranging transceiver. In alternate embodiments, low frequency transceiver 1275 is any transceiver capable of operating at low frequencies using signal strength, phase comparison, or other techniques to localize hot spots on the exterior of a stack, allowing localization of a shipping container.

In one embodiment, the low frequency receiver 1275 includes an H field receiver responseive to an H field antenna 1298 and an E field receiver responsive to an E field antenna 1299. The E field and H field receivers may measure signal properties such as signal amplitude and phase. The system may then compare E and H field amplitude or may compare E and H field phase to determine distance between the transmitter and receiver. Multiple receivers at known positions may be used to determine position of the transmitter by triangulation using the multiple distance measurements. Further details on the use of low frequency signals for distance determination and positioning may be found in U.S. patent application Ser. No. 10/355,612; Pub. No. US 2004/0032363, Titled "System and Method for Near-Field Electromagnetic Ranging" Filed Jan. 31, 2003 by Schantz, which is incorporated herein by reference in its entirety.

High speed data transceiver 1276 may be an 802.11b, 802.11a, 802.11g, or any other suitable high speed data transceiver. High speed data transceiver 1276 preferentially operates in a line-of-sight or near line-of-sight environment, for instance when shipping container 1121 is enters into a facility in which Low Frequency Marine Asset Tag Tracking System 1100 is present or on board a ship on which Low Frequency Marine Asset Tag Tracking System 1100 is present. High speed data transceiver 1276 may also operate in non-line-of-sight environments.

Video camera 1277 allows monitoring of an area within which Low Frequency Marine Asset Tag Tracking System 1100 has been deployed. In the event of an alarm or alert condition, review of images from video camera 1277 may allow an alarm or alert to be diagnosed and status of a shipping container to be verified.

Microprocessor 1279 may include input/output capability, memory and/or data storage capability, and processing capability. Preferentially, microprocessor 1279 also includes the ability to monitor data from low frequency transceiver 1275, high frequency data link 1276, and video camera 1277. Preferentially, microprocessor 1279 further processes and reacts to data. Additionally microprocessor 1279 conveys pertinent data to local data center 1180 intermediate network interface 1278.

Detail of a Near Field Transceiver

Figure 13:
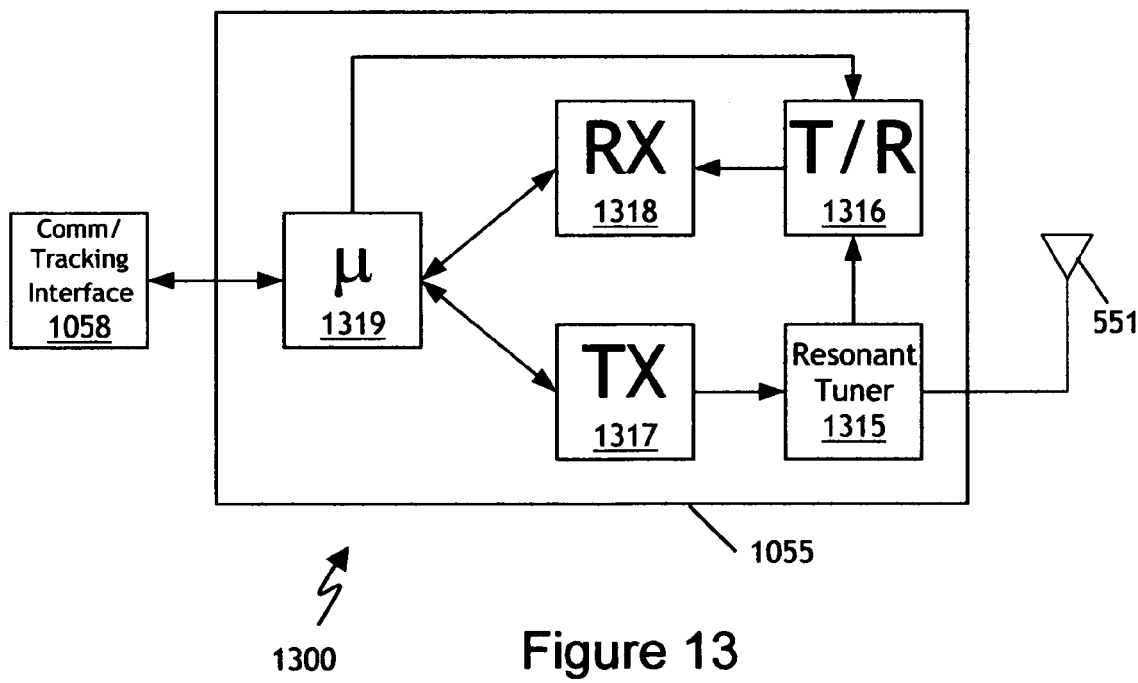
FIG. 13 provides a block diagram of a low frequency transceiver.

FIG. 13 provides block diagram 1300 of near field transceiver 1055. Near field transceiver 1055 comprises resonant tuner 1315, transmit/receive switch 1316, transmitter 1317, receiver 1318, microprocessor 1319, and near field antenna 551. Microprocessor 1319 communicates with a Marine Asset Tag via comm./tracking interface 1058.

Figure 14:
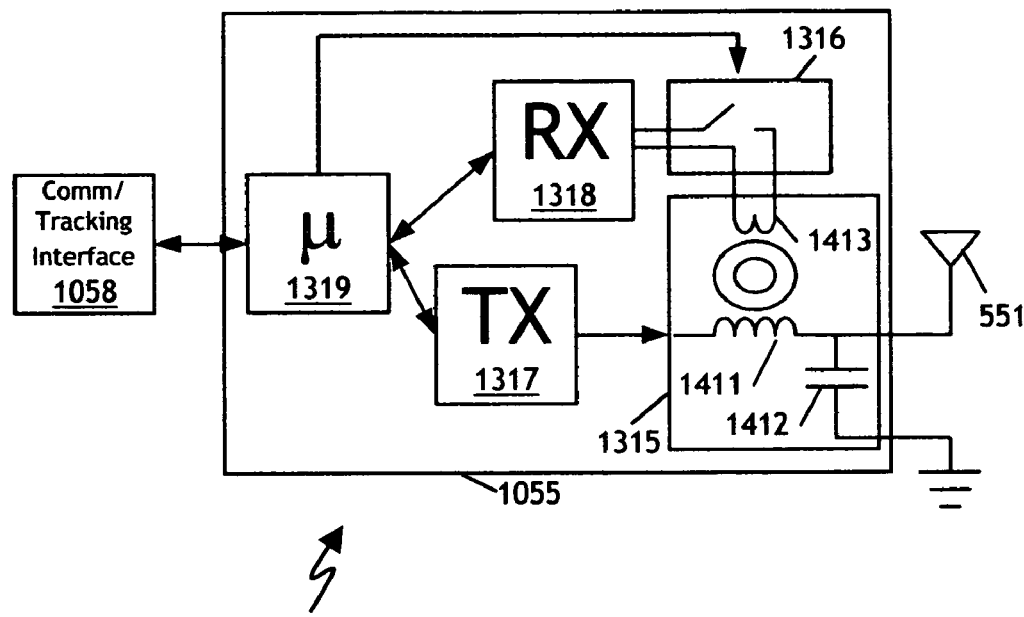
FIG. 14 provides a block diagram of a low frequency transceiver with detail of a coupling resonant tuner.

FIG. 14 provides block diagram 1400 of near field transceiver 1055 with detail of a coupling resonant tuner 1315. Near field transceiver 1055 comprises resonant tuner 1315, transmit/receive switch 1316, transmitter 1317, receiver 1318, microprocessor 1319, and near field antenna 551. Microprocessor 1319 communicates with a Marine Asset Tag via comm./tracking interface 1058. A coupling resonant tuner includes inductor 1411 and capacitor 1412 which cooperate with antenna 551 to make antenna 551 responsive to signals of a particular frequency. Coupling coil 1413 creates a transformer coupling to inductor 1411. When transmit receive switch 1316 is open, transmitter 1317 cooperates with resonant tuner 1315 and near field antenna 551 to transmit signals. When transmit receive switch 1316 is closed and transmitter 1317 is dormant, receiver 1318 cooperates with resonant tuner 1315 and antenna 551 to receive signals.

Detail of an Electromagnetic Sensor

Terrorists often prefer to detonate a device remotely using a cell phone or similar triggering mechanism. Thus, it is desirable to detect an active transceiver within a shipping container. To meet this need, the present invention teaches use of an electromagnetic sensor.

Figure 15:
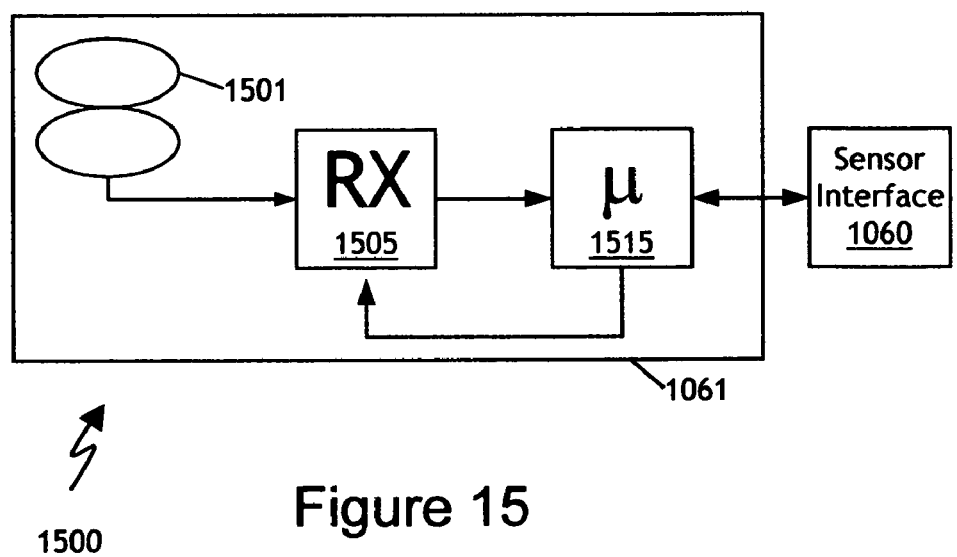
FIG. 15 shows an electromagnetic sensor suitable for use with the present system.

FIG. 15 presents block diagram of an electromagnetic sensor 1061 suitable for use with the present system. The electromagnetic sensor of FIG. 15 may be any one of the sensors 1061-1064 illustrated in FIG. 10. Electromagnetic sensor 1061 comprises antenna 1501, power receiver 1505, and a microprocessor 1515. Antenna 1501 is preferentially a broadband or ultra-wideband antenna. Electromagnetic sensor 1061 conveys signals to a Marine Asset Tag intermediate sensor interface 1060.

Figure 16:
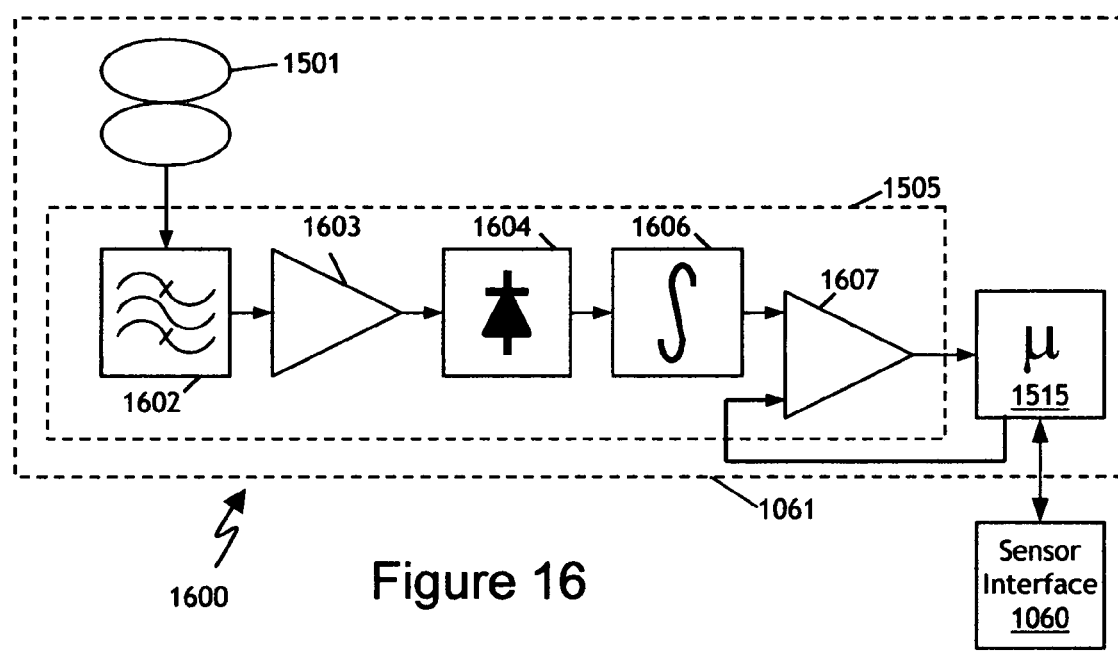
FIG. 16 shows an alternate embodiment of an electromagnetic sensor suitable for use with the present system.

FIG. 16 shows block diagram 1600 of an alternate embodiment of an electromagnetic sensor 1061 suitable for use with the present system. Electromagnetic sensor 1061 comprises antenna 1501, power receiver 1505, and a microprocessor 1515. Antenna 1501 is preferentially a broadband or ultra-wideband antenna. Electromagnetic sensor 1061 conveys signals to a Marine Asset Tag intermediate sensor interface 1060. In a preferred embodiment, power receiver 1505 comprises pre-select filter 1602, pre-amp 1603, diode detector 1604, integrator 1606, and comparator 1607. Microprocessor 1515 provides a reference threshold to comparator 1607. If received power exceeds a reference threshold, comparator 1607 conveys a signal to microprocessor 1515 which in turn notifies a Marine Asset Tag via sensor interface 1060.

Near Field Electromagnetic Ranging For Purposes Of Positioning

The present invention relates generally to measurement of position or location by means of electromagnetic signaling and especially to a system and method for evaluating a position of a trasmitter (or "beacon") with respect to a plurality of receivers (or "trackers"). Alternatively, the present invention describes a means for determining a position of a receiver (or "tracker") with respect to a plurality of transmitters (or "beacons"). The present invention may be advantageously used as part of a more general system for determining position (range and bearing) or for tracking (determining position in near real time). In addition, the present invention aims to determine position or location of goods in commerce or other assets using low frequency positioning techniques (near field electromagnetic ranging). Furthermore, the present invention discloses techniques for monitoring and ensuring the safety and security of goods in commerce and other assets.

Near field electromagnetic ranging comprises a family of techniques for determining location or position of a transmitter within approximately a half wavelength of a transmitter. These techniques typically involve a comparison between or among one or more near field properties to generate a solution or result. Near field properties may include the amplitude and/or phase of electric and/or magnetic field components in various directions. Near field electromagnetic ranging was first fully described in applicant's co-pending "System and Method for Near Field Electromagnetic Ranging," Filed Jan. 31, 2003, Ser. No. 10/355,612, published as Pub. No. US 2004/0032363 A1, to Schantz et al. This document has been incorporated herein by reference.

The electromagnetic behavior exploited by near field electromagnetic ranging can be impacted by the complexity of a propagation environment. Large metal objects or structures in a particular environment can alter or perturb the behavior of near field signals. For accurate positioning, a near field electromagnetic ranging system may require a calibration process. Calibration data is collected at known positions throughout a propagation environment. Then, the resulting database of calibration data may be used in conjunction with the results of a near field electromagnetic ranging measurement in order to generate a more accurate position or location. Calibration of near field electromagnetic ranging was first fully described in applicant's co-pending "Near Field Electromagnetic Positioning System and Method," Filed Oct. 4, 2004, Ser. No. 10/958,165, published as Pub. No. US 2005/0046608 A1 to Schantz et al. This document has been incorporated herein by reference.

The present invention seeks to measure position or location in the challenging propagation environment in and around storage areas for goods in commerce. These challenging propagation environments may include propagation around stacked cargo containers either on board a ship, or in ports or other storage facilities. These challenging propagation environments may further include propagation in warehouses, storage yards, supply depots, or other locations where goods or assets are stored.

CONCLUSION

Specific applications have been presented solely for purposes of illustration to aid the reader in understanding a few of the great many contexts in which the present invention will prove useful. It should also be understood that, while the detailed drawings and specific examples given describe preferred embodiments of the invention, they are for purposes of illustration only, that the system and method of the present invention are not limited to the precise details and conditions disclosed and that various changes may be made therein without departing from the spirit of the invention.

We claim:

1. A system for determining a location of a particular object among a plurality of similar objects; each of said plurality of similar objects having three overall dimensions comprising a length, a width, and a height, said plurality of similar objects being closely spaced from one another relative to at least one dimension of said three overall dimensions;

said system comprising:
   a transmitter for transmitting a locating signal, said locating signal having a wavelength greater than at least one said overall dimension, said transmitter located with said particular object;
   a plurality of locator receivers displaced from said plurality of similar objects, said plurality of locator receivers receiving said locating signal and determining at least one respective property of said locating signal at each respective receiver;
   a processing unit utilizing said at least one respective property of said locating signal at each respective receiver to determine said location of said particular object based on determining a location of a conduction hot spot on said plurality of similar objects resulting from said locating signal.

2. The system as in claim 1, wherein the at least one respective property of said locating signal at each respective receiver is signal strength.

3. The system as in claim 1, wherein at least two properties of the locating signal are measured and the at least two properties are compared to determine said location of said hot spot on said plurality of similar objects resulting from said locating signal.

4. The system as in claim 1, further including a database of measurements of said at least one respective property of said locating signal at each respective receiver, said database of said measurements being previously taken for a plurality of known locations of said particular object, wherein said processing unit compares said database of measurements with a new measurement of said at least one respective property of said locating signal at each respective receiver to determine the location of said particular object.

5. A system for determining a location of a particular object among a plurality of similar objects; each of said plurality of similar objects having three overall dimensions comprising a length, a width, and a height, said plurality of similar objects and closely spaced from one another relative to at least one dimension of said three overall dimensions;

said system comprising:
- a transmitter for transmitting a locating signal, said locating signal having a wavelength greater than at least one said overall dimension, said transmitter located with said particular object;
- a plurality of locator receivers displaced from said plurality of similar objects and receiving said locating signal and determining at least two respective properties of said locating signal at each respective receiver;
- a processing unit comparing said at least two respective properties of said locating signal at each respective receiver to determine said location of said particular object based on determining a location of a conduction hot spot on said plurality of similar objects resulting from said locating signal.

6. The system of claim 5, wherein the wavelength is greater than the greatest said overall dimension.

7. The system of claim 5, wherein the position of the transmitter is expected to be within an expected distance limit and wherein the wavelength is greater than the expected distance limit.

8. The system of claim 5, wherein the particular object comprises a shipping container.

9. The system of claim 8, wherein the shipping container is embedded in a stack of other shipping containers having a spacing less than 30.5 cm, and wherein said wavelength is greater than 61 meters.

10. The system of claim 5, wherein the system further includes at least one sensor collocated with said transmitter.

11. The system of claim 10, wherein said sensor is a temperature sensor.

12. The system of claim 10, wherein said sensor is an RF energy detector.

13. The system of claim 12, wherein said RF energy detector is a cell phone band RF energy detector.

14. The system of claim 10, wherein said sensor is one of a radiation detector, chemical detector, motion detector, or intrusion detector.

15. The system of claim 5, wherein said at least two respective properties of said locating signal at each respective receiver include an amplitude of an electric field component of said locating signal and an amplitude of a magnetic field component of said locating signal.

16. The system of claim 5, wherein said at least two respective properties of said locating signal at each respective receiver include a phase of an electric field component of said locating signal and a phase of a magnetic field component of said locating signal.

17. A method for determining a location of a particular object among a plurality of similar objects; each of said plurality of similar objects having three overall dimensions comprising a length, a width, and a height, said plurality of similar objects being closely spaced from one another relative to at least one dimension of said three overall dimensions;

said method comprising:
- positioning a transmitter in association with said particular object;
- transmitting a locating signal from said transmitter, said locating signal having a wavelength greater than at least one overall dimension of the particular object, said at least one overall dimension from the group consisting of length, width, and height;
- receiving at least two properties of the locating signal;
- comparing said at least two respective properties of said locating signal at each respective receiver to determine said location of said particular object based on determining a location of a conduction hot spot on said plurality of similar objects resulting from said locating signal.

18. The system as in claim 5, wherein the locating signal is modulated with data, further including
a demodulator for demodulating said data from said locating signal.

19. The system as in claim 18, further including an RF sensor for detecting the presence RF energy in the vicinity of said asset; wherein said data includes data relating to the detection of said RF energy.

20. The system of claim 5, wherein the locating signal is modulated with data from a data source, said particular object disposed within a confined space having a set of overall dimensions of said confined space, and said locating signal having a wavelength greater than at least one dimension of said set of overall dimensions of said confined space;
at least one of said plurality of locator receivers further including a demodulator for demodulating said data from said locating signal.

* * * * *